United States Patent
Zheng et al.

(10) Patent No.: US 10,133,941 B2
(45) Date of Patent: Nov. 20, 2018

(54) METHOD, APPARATUS AND DEVICE FOR DETECTING LANE BOUNDARY

(71) Applicants: NEUSOFT CORPORATION, Shenyang (CN); NEUSOFT REACH AUTOMOTIVE TECHNOLOGY (SHANGHAI) CO., LTD., Shanghai (CN)

(72) Inventors: Jiatong Zheng, Shenyang (CN); Yingfang Du, Shenyang (CN); Wei Liu, Shenyang (CN)

(73) Assignees: NEUSOFT CORPORATION, Shenyang (CN); NEUSOFT REACH AUTOMOTIVE TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/279,454

(22) Filed: Sep. 29, 2016

(65) Prior Publication Data

US 2018/0033148 A1    Feb. 1, 2018

(30) Foreign Application Priority Data

Jul. 26, 2016   (CN) .......................... 2016 1 0594540

(51) Int. Cl.
  *G06K 9/00*   (2006.01)
  *B60R 1/00*   (2006.01)
  *G06T 7/00*   (2017.01)

(52) U.S. Cl.
  CPC ............ *G06K 9/00798* (2013.01); *B60R 1/00* (2013.01); *G06T 7/00* (2013.01); *G06T 7/0085* (2013.01);

(Continued)

(58) Field of Classification Search
  CPC ......... G06T 7/0085; G06T 2207/30256; B60R 1/00; B60R 2300/307; B60R 2300/804; G06K 9/00798
  See application file for complete search history.

(56) References Cited

U.S. PATENT DOCUMENTS 9,317,756 B2    4/2016 Takemae et al.
2005/0273260 A1*  12/2005 Nishida .................... B60Q 1/34
                                                701/301

(Continued)

FOREIGN PATENT DOCUMENTS

JP    H04311211 A    11/1992
JP    2010224787 A    10/2010

(Continued)

OTHER PUBLICATIONS

The JP First Office Action dated Jan. 23, 2018 in the corresponding JP application (application No. JP2016-191013).

*Primary Examiner* — Ping Y Hsieh
(74) *Attorney, Agent, or Firm* — Kilpatrick Townsend & Stockton LLP

(57) ABSTRACT

A method, an apparatus and a device for detecting lane boundaries are provided. The method includes: obtaining a current image of a lane, and extracting brightness jump points in the image by filtering the image; filtering out noise points from the brightness jump points, and determining remaining brightness jump points as edge points to form groups of the edge points, where a connection line of edge points in the same group forms one edge line; recognizing edge lines of the lane boundaries from edge lines; and grouping the edge lines of the lane boundaries, and recognizing edge lines in each group as edge lines of one lane boundary. Based on the method, a calculation for detecting the lane boundaries is simpler, and calculation resources and (Continued)

time consumed in detecting the lane boundaries are reduced to detect the lane boundaries accurately and quickly.

20 Claims, 7 Drawing Sheets

(52) U.S. Cl.
CPC ... *B60R 2300/307* (2013.01); *B60R 2300/804* (2013.01); *G06T 2207/30256* (2013.01)

(56) References Cited

U.S. PATENT DOCUMENTS

| | | | |
|---|---|---|---|
| 2015/0227800 A1* | 8/2015 | Takemae | B60R 1/00 382/104 |
| 2015/0248837 A1* | 9/2015 | Kim | G08G 1/167 348/148 |
| 2015/0262020 A1* | 9/2015 | Kataoka | G06K 9/00798 382/104 |
| 2016/0176358 A1* | 6/2016 | Raghu | G06K 9/00798 382/104 |
| 2016/0350603 A1* | 12/2016 | Suddamalla | G06K 9/00798 |

FOREIGN PATENT DOCUMENTS

| | | |
|---|---|---|
| JP | 2013161190 A | 8/2013 |
| JP | 2015191372 A | 11/2015 |

\* cited by examiner

METHOD, APPARATUS AND DEVICE FOR DETECTING LANE BOUNDARY

CROSS REFERENCES OF RELATED APPLICATION

This application claims priority to Chinese Patent Application No. 201610594540.6, filed on Jul. 26, 2016, which is hereby incorporated by reference in its entirety.

TECHNICAL FIELD

The present disclosure relates to the technical field of information processing, and in particular to a method, an apparatus and a device for detecting lane boundaries.

BACKGROUND

At present, many vehicles are provided with driving assistance systems. Some driving assistance systems may provide vehicles with information about driving lanes by detecting lane boundaries on a road, such as a lane departure warning system. The lane boundaries may not only include lane marking lines, but also include boundary markers of the entire road such as curbs and guardrails of the road. In order to detect lane boundaries, a conventional driving assistance system usually performs comparison and analysis on an entire lane image to be detected which is taken by a monocular camera and an entire known lane boundary image based on a machine learning method, to recognize regions of the lane boundaries in the lane image to be detected. By research, the inventors found that, in recognizing the lane boundaries in the lane image based on the machine learning method, the conventional driving assistance system needs to go through a very complicated calculation, which may result in lots of calculation resources and time being consumed in the process of detecting the lane boundaries.

SUMMARY

The present disclosure is to provide a method, an apparatus and a device for detecting lane boundaries, so as to simplify a calculation for the process of detecting the lane boundaries and then reduce calculation resources and time to be consumed in the process of detecting the lane boundaries. In this way, a driving assistance system can detect the lane boundaries accurately and quickly.

In a first aspect, a method for detecting a lane boundaries is provided, which includes:

obtaining a current image of a lane, and extracting brightness jump points in the current image by filtering the current image;

filtering out noise points from the brightness jump points, and determining remaining brightness jump points as edge points to form groups of the edge points, where two edge points meeting a first pre-determined condition are in the same group, the first pre-determined condition includes that vertical coordinates of two points are adjacent and a distance difference between horizontal coordinates of the two points is less than a first distance threshold, the noise points include a first noise point, the first noise point does not meet the first pre-determined condition with any one of other brightness jump points, and a connection line of edge points in the same group forms one edge line;

recognizing edge lines of the lane boundaries from edge lines; and grouping the edge lines of the lane boundaries, and recognizing edge lines in each group as edge lines of one lane boundary, where a difference between horizontal coordinates of two edge lines in the same group is less than a second distance threshold.

Optionally, the first pre-determined condition further includes that a gradient angle between the two points is less than a threshold of gradient angle.

Optionally, the noise points further include a second noise point, and the second noise point meets at least one of the following pre-determined conditions:

a second pre-determined condition being that: a difference between a mean gray level of a first left horizontal region and a mean gray level of a second left horizontal region is less than a first threshold of mean gray level;

a third pre-determined condition being that: a difference between a mean gray level of a first right horizontal region and a mean gray level of a second right horizontal region is less than a second threshold of mean gray level;

a fourth pre-determined condition being that: a difference between a gray level variance of a first left horizontal region and a gray level variance of a second left horizontal region is less than a first threshold of gray level variance;

a fifth pre-determined condition being that: a difference between a gray level variance of a first right horizontal region and a gray level variance of a second right horizontal region is less than a second threshold of gray level variance;

the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;

the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;

the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;

the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

Optionally, the recognizing edge lines of the lane boundaries from edge lines specifically includes: recognizing edge lines meeting a sixth pre-determined condition and/or a seventh pre-determined condition from the edge lines as the edge lines of the lane boundaries;

the sixth pre-determined condition is that: a confidence level of an edge line is greater than a confidence level threshold, where the confidence level of the edge line represents a probability of the edge line belonging to the edge lines of the lane boundaries, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

Optionally, the method further includes: recognizing a lane boundary meeting an eighth pre-determined condition, a lane boundary meeting a ninth pre-determined condition and/or a lane boundary meeting a tenth pre-determined condition as curbs;

where the eighth pre-determined condition is that: a lane boundary includes three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary includes two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary includes two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

Optionally, the method further includes: recognizing a recognition region including the lane boundary in the current image based on a trained machine learning model to recognize a lane boundary belonging to a guardrail; where the machine learning model is trained based on an image of a guardrail and an image of an object that is not a guardrail.

Optionally, the recognizing a recognition region including the lane boundary in the current image based on a trained machine learning model to recognize a lane boundary belonging to a guardrail includes:

determining each lane boundary in the current image as a recognition target respectively, and selecting at least one recognition region including the recognition target from the current image based on a location of the recognition target in the current image;

recognizing each recognition region based on the machine learning model, to determine whether the each recognition region is a region including the guardrail; and determining the recognition target as the guardrail if a ratio of the number of regions including the guardrail to the number of the recognition regions including the recognition target exceeds a ratio threshold.

Optionally, the method further includes: recognizing a lane boundary meeting an eleventh pre-determined condition as a curb in a case that the lane marking line and the guardrail have been recognized from the lane boundaries in the current image; where the eleventh pre-determined condition is that: a lane boundary is located between the lane marking line and the guardrail, and a distance between horizontal coordinates of two edge lines of the lane boundary is less than a seventh distance threshold.

Optionally, the method further includes: distinguishing the lane boundary in the current image as a lane marking line, a guardrail and/or a curb based on locations of a curb, a guardrail and a lane marking line in historical images.

In a second aspect, an apparatus for detecting lane boundaries is provided, which includes:

an obtaining unit, configured to obtain a current image of a lane;

an extracting unit, configured to extract brightness jump points in the current image by filtering the current image;

a grouping unit, configured to filter out noise points from the brightness jump points, and determine remaining brightness jump points as edge points to form groups of the edge points, where two edge points meeting a first pre-determined condition are in the same group, the first pre-determined condition includes that vertical coordinates of two points are adjacent and a distance difference between horizontal coordinates of the two points is less than a first distance threshold, the noise points include a first noise point, the first noise point does not meet the first pre-determined condition with any one of other brightness jump points, and a connection line of edge points in the same group forms one edge line;

a first recognition unit, configured to recognize edge lines of the lane boundaries from edge lines; and a second recognition unit, configured to group the edge lines of the lane boundaries, and recognize edge lines in each group as edge lines of one lane boundary, where a difference between horizontal coordinates of two edge lines in the same group is less than a second distance threshold.

In a third aspect, a device for detecting lane boundaries is provided, which includes a processor, a memory, a communication interface and a bus system;

where the bus system is configured to couple various hardware components of the device together;

the communication interface is configured to achieve a communication connection between the device and at least one of other devices;

the memory is configured to store program instructions and data; and the processor is configured to read the program instructions and the data stored in the memory, to perform the following operations:

obtaining a current image of a lane, and extracting brightness jump points in the current image by filtering the current image;

filtering out noise points from the brightness jump points, and determining remaining brightness jump points as edge points to form groups of the edge points, where edge points meeting a first pre-determined condition are in the same group, the first pre-determined condition includes that vertical coordinates of two points are adjacent and a distance difference between horizontal coordinates of the two points is less than a first distance threshold, the noise points include a first noise point, the first noise point does not meet the first pre-determined condition with any one of other brightness jump points, and a connection line of edge points in the same group forms one edge line;

recognizing edge lines of the lane boundaries from edge lines; and grouping the edge lines of the lane boundaries, and recognizing edge lines in each group as edge lines of one lane boundary, where a difference between horizontal coordinates of two edge lines in the same group is less than a second distance threshold.

In the present disclosure, for the current image of the lane, the brightness jump points in the current image may be extracted by filtering the current image, the noise points may be filtered out based on location information of the brightness jump points, and remaining brightness jump points are determined as the edge points to form the groups, where edge points in each of the groups can form one edge line. In this way, edge lines belonging to the same lane boundary can be determined based on a distance between the edge lines. The edge lines of the lane boundary can mark a region of the lane boundary in the current image, so that detection of the lane boundary is realized. It can be seen that, since there is no need to perform analysis and recognition on the entire image with a machine learning model during detecting the lane boundaries, a calculation for the process of detecting the lane boundaries is simpler, and calculation resources and time consumed in the process of detecting the lane boundaries are reduced. Therefore, the lane boundary can be detected accurately and quickly.

BRIEF DESCRIPTION OF THE DRAWINGS

In order to illustrate technical solutions in embodiments of the present disclosure more clearly, drawings used in the description of the embodiments are introduced briefly hereinafter. Apparently, the drawings described hereinafter merely illustrate some embodiments of the present disclosure, and other drawings may be obtained by those skilled in the art based on these drawings.

DETAILED DESCRIPTION OF THE EMBODIMENTS

By research, the inventors found that, lane boundaries may not only include lane marking lines, but also include boundary markers of the entire road such as curbs and guardrails of the road. In order to better assist a driver to operate, both lane marking lines and boundary markers, such as curbs and guardrails of the road, need to be detected. In order to detect all types of lane boundaries, a conventional driving assistance system needs to analyze and recognize an entire image based on a machine learning model. Specifically, the machine learning model needs to perform training and learning based on an entire lane image in which a lane boundary region is known, and then the driving assistance system needs to perform analysis and calculation on an entire lane image, in which a lane boundary region is unknown, based on the trained machine learning model, to recognize the lane boundary region. That is, the conventional driving assistance system needs to compare an entire lane image in which a lane boundary region is unknown with an entire lane image in which a lane boundary region is known, based on the machine learning model. In practice, since situation of a road is complex, stains and water marks which often occur on the road may make differences between the road and non-driving zones such as a curb and a pavement in a lane image less obvious. In order to detect lane boundaries from the lane image in a case that the differences are not obvious, the conventional driving assistance system needs to go through a very complicated calculation in analyzing the entire lane image based on the machine learning model, which may result in lots of calculation resources and time being consumed in the process of detecting the lane boundaries.

Based on the above, in an embodiment of the present disclosure, for a current image of a lane, brightness jump points in the current image may be extracted by filtering the current image, noise points may be filtered out based on location information of the brightness jump points, and remaining brightness jump points are determined as edge points to form groups, where edge points in each of the groups can form one edge line. In this way, edge lines belonging to the same lane boundary can be determined based on a distance between edge lines. A boundary line of a lane boundary can mark a region of the lane boundary in the current image, so that detection of the lane boundary is realized. It can be seen that, since there is no need to perform analysis and recognition on the entire image with a machine learning model during detecting the lane boundaries, a calculation for the process of detecting the lane boundaries is simpler, and calculation resources and time consumed in the process of detecting the lane boundaries are reduced. Therefore, the lane boundary can be detected accurately and quickly.

Figure 1:
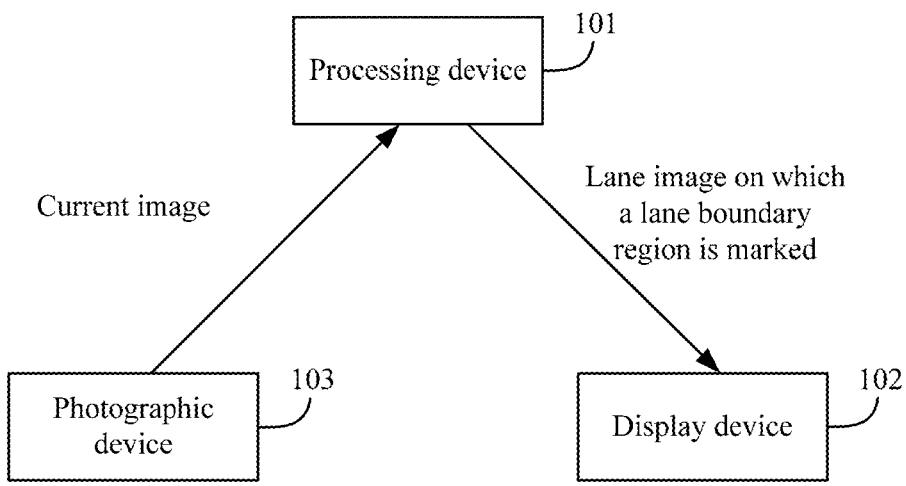
FIG. 1 is a schematic block diagram of a system involved in an application scenario according to an embodiment of the present disclosure.

For example, a scenario according to an embodiment of the present disclosure may involve a system shown in FIG. 1. The system may be a driving assistance system, and specifically, the system may be a lane departure warning system. The system includes a processing device 101, a display device 102 and a photographic device 103. In the system, the photographic device 103 may shoot a current image of a lane and send the current image to the processing device 101. The processing device 101 may obtain the current image and extract brightness jump points in the current image by filtering the current image. The processing device 101 may filter out noise points from the brightness jump points, and determine remaining brightness jump points as edge points to form groups of the edge points, where a connection line of edge points in the same group may form one edge line. The processing device 101 may recognize edge lines of the lane boundaries from edge lines, group the edge lines of the lane boundaries, and recognize edge lines in each group as edge lines of one lane boundary. Then, the processing device 101 may generate a lane image, in which a lane boundary region is marked, based on the edge lines of the lane boundary, and send the lane image to the display device 102 to enable the display device 102 to display it.

A difference between horizontal coordinates of two edge lines in the same group is less than a second distance threshold. edge points meeting a first pre-determined condition are in the same group, the first pre-determined condition includes that vertical coordinates of two points are adjacent, a distance difference between horizontal coordinates of the two points is less than a first distance threshold and a gradient angle difference is less than a threshold of gradient angle. Herein, the noise points include a first noise point, and the first noise point does not meet the first pre-determined condition with any one of other brightness jump points.

Figure 14:
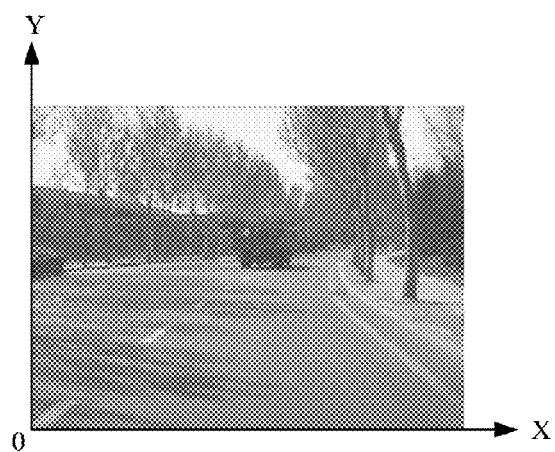
FIG. 14 is a schematic diagram of an example of an image coordinate system according to an embodiment of the present disclosure.

It should be noted that, the horizontal coordinates and the vertical coordinates may be horizontal coordinates and vertical coordinates in a plane coordinate system established based on the lame image. In an example of a plane coordinate system established based on a lane image, the origin may be a vertex in a lower left corner of the lane image, the horizontal axis may be a lower boundary line of the lane image, and the vertical axis may be a left boundary line of the lane image, as shown in FIG. 14.

It can be understood that, the above scenario is merely a scenario example according to an embodiment of the present disclosure, and the present disclosure is not limited to the scenario.

Specific implementations of a method, an apparatus and a device for detecting lane boundaries according to embodiments of the present disclosure are described hereinafter in conjunction with the drawings.

Figure 2:
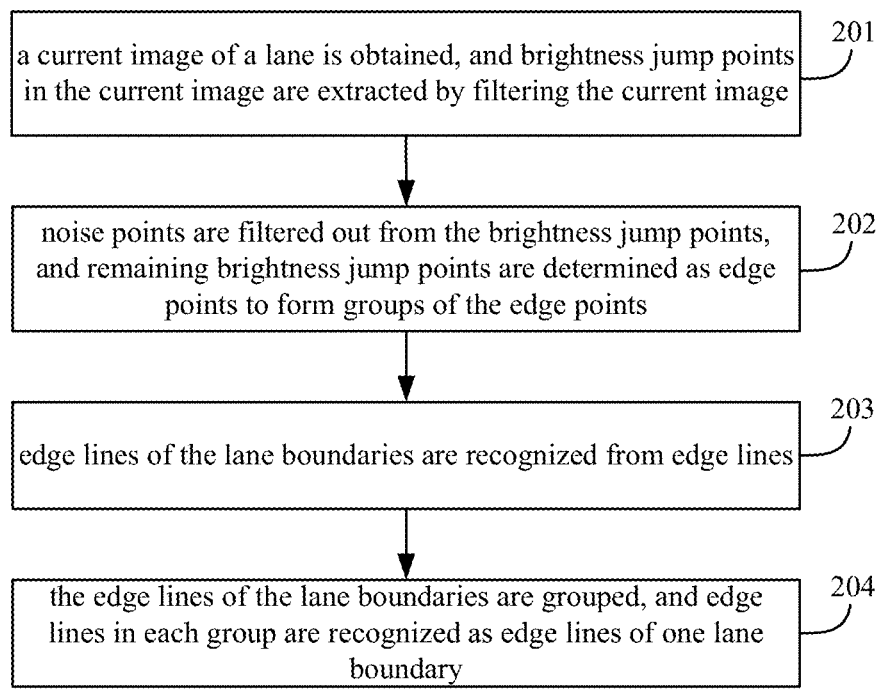
FIG. 2 is a schematic flow chart of a method for detecting lane boundaries according to an embodiment of the present disclosure.

Reference is made to FIG. 2, which is a schematic flow chart of a method for detecting lane boundaries according to an embodiment of the present disclosure. In the embodiment, the method may specifically include steps 201 to 204.

In step 201, a current image of a lane is obtained, and brightness jump points in the current image are extracted by filtering the current image.

The brightness jump points represent pixels at which brightness jump occurs. In the current image, a lane boundary region usually differs greatly from surrounding regions thereof in brightness, hence, pixels on edge lines of the lane boundary are usually brightness jump points. The brightness jump points obtained by filtering the current image may be used to determine the edge lines of the lane boundary, so that the lane boundary region in the current image may be determined based on the edge lines of the lane boundary.

It can be understood that, in the embodiment, the brightness jump points in the current image may be extracted based on any filtering method. For example, a way of extracting brightness jump points by filtering a lane image has been provided in the conventional technology, which is not described in the embodiment.

In step 202, noise points are filtered out from the brightness jump points, and remaining brightness jump points are determined as edge points to form groups of the edge points. Two edge points meeting a first pre-determined condition are in the same group. The first pre-determined condition includes that vertical coordinates of two points are adjacent and a distance difference between horizontal coordinates of the two points is less than a first distance threshold. The noise points include a first noise point, and the first noise point does not meet the first pre-determined condition with any one of other brightness jump points. A connection line of edge points in the same group forms one edge line.

In the step 202, for the multiple brightness jump points extracted from the current image, information such as locations and gradient angles of the brightness jump points are analyzed. In an aspect, brightness jump points belonging to different edge lines can be distinguished to form the groups of the edge points; in another aspect, the noise points in the brightness jump points, which do not belong to any edge line, can be filtered out.

It can be understood that, in the step 202, the edge points may be grouped based on the first pre-determined condition which is set in a system in advance. Specifically, given that locations of edge points on the same edge line should have continuity, a horizontal distance between two edge points is short if the two edge points on the same edge line are adjacent in the vertical direction. Based on the above, the first pre-determined condition may include that vertical coordinates of two points are adjacent, a distance difference between horizontal coordinates of the two points is less than the first distance threshold, and a gradient angle difference is less than a threshold of gradient angle.

Specifically, the first pre-determined condition may be expressed as the following equation 1:

$$\text{abs}(A-B) \leq \text{DisDiffThresh} \qquad \text{equation 1:}$$

A and B respectively represent horizontal coordinates of two points which have adjacent vertical coordinates, DisDiffThresh represents the first distance threshold, and abs represents an operation of taking the absolute value.

Figure 3:
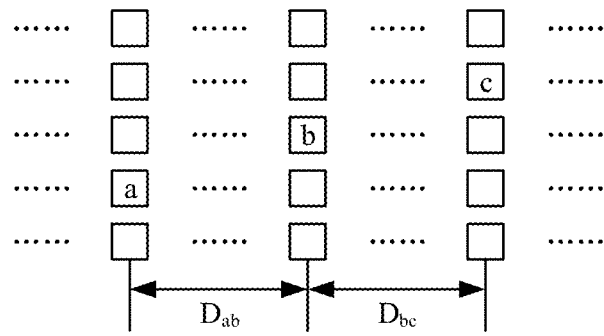
FIG. 3 is a schematic diagram of an example of grouping edge points according to an embodiment of the present disclosure.

It should be noted that, for any two brightness jump points in the current image, if the two brightness jump points meet the first pre-determined condition, then the two brightness jump points belong to edge points on the same edge line and can be grouped into the same group. For example, in an image example shown in FIG. 3, each small square represents a pixel in the image, and all of a, b and c are brightness jump points. It can be seen from FIG. 3 that, a vertical coordinate of a and that of b are adjacent, the vertical coordinate of b and that of c are adjacent, a difference between a horizontal coordinate of a and that of b is $D_{ab}$, and a difference between the horizontal coordinate of b and that of c is $D_{bc}$. If $D_{ab}$ is less than the first distance threshold, a and b meet the first pre-determined condition, and a and b are grouped into the same group. If $D_{bc}$ is less than the first distance threshold, b and c meet the first pre-determined condition, and b and c are grouped into the same group. It can be understood that, in a case that a and b meet the first pre-determined condition and b and c also meet the first pre-determined condition, although the vertical coordinate of a and that of c are not adjacent, i.e., a and c not meeting the first pre-determined condition, a, b and c can be grouped into the same group since a and b are grouped into the same group and b and c are grouped into the same group. That is, a, b and c are located on the same edge line.

Further, given that gray level changes between two sides of edge points on the same edge line are of similar magnitude, if two edge points on the same edge line are adjacent in the vertical direction, gradient angles of the two edge points are very similar. Based on the above, the first pre-determined condition may further include that a gradient angle between the two points is less than the threshold of gradient angle. That is, the first pre-determined condition may be that vertical coordinates of two points are adjacent, a distance difference between horizontal coordinates of the two points is less than the first distance threshold, and a gradient angle difference is less than the threshold of gradient angle.

Specifically, the first pre-determined condition may be expressed as the above equation 1 and the following equation 2:

$$\text{abs}(C-D) \leq \text{GradAngleThresh.} \qquad \text{equation 2:}$$

C and D respectively represent gradient angles of two points which have adjacent vertical coordinates, GradAngleThresh represents the threshold of gradient angle, and abs represents an operation of taking the absolute value. It can be understood that, in the brightness jump points extracted in the step 201, some points are noise points that are not located on the edge lines. In order to prevent the noise points from affecting the process of recognizing the lane boundaries, the noise points can be filtered out in the process of grouping the edge points.

Given that an edge line consists of multiple edge points, if a brightness jump point dose not meet the first pre-determined condition with any one of other brightness jump points in the image, i.e., the brightness jump point not being located on the same line as any one of other brightness jump points, the brightness jump point is not an edge point on an edge line and is a noise point. A noise point of such a type is determined as a first noise point, and the first noise point may be filtered out in the process of grouping the edge points. The first pre-determined condition mentioned herein may be expressed as the above equation 1, or may be expressed as the above equation 1 and the above equation 2.

Further, given that gray levels at two sides of edge points on an edge line have continuity, gray levels at two sides of edge points on the same edge line which are close to each other should be similar. Therefore, if gray levels at two sides of a brightness jump point greatly differ from gray levels at two sides of another brightness jump point which is close to it, the brightness jump point is not an edge point on an edge line and is a noise point. A noise point of such a type is determined as a second noise point. In the process of grouping the noise points, not only can the first noise point be filtered out, but the second noise point can also be filtered out.

In order to recognize whether gray levels at two sides of brightness jump points which are close to each other are greatly different, to filter out the second noise point, in some implementations of the present disclosure, a second pre-determined condition, a third pre-determined condition, a fourth pre-determined condition and/or a fifth pre-determined condition may be adopted. For example, for a brightness jump point extracted in the step 201, if the brightness jump point meets at least one of the second pre-determined condition, the third pre-determined condition, the fourth pre-determined condition and the fifth pre-determined condition, the brightness jump point can be filtered out as a second noise point.

The second pre-determined condition may specifically be that: a difference between a mean gray level of a first left horizontal region and a mean gray level of a second left horizontal region is less than a first threshold of mean gray level. The third pre-determined condition may specifically be that: a difference between a mean gray level of a first right horizontal region and a mean gray level of a second right horizontal region is less than a second threshold of mean gray level. The fourth pre-determined condition may be that: a difference between a gray level variance of a first left horizontal region and a gray level variance of a second left horizontal region is less than a first threshold of gray level variance. The fifth pre-determined condition may be that: a difference between a gray level variance of a first right horizontal region and a gray level variance of a second right horizontal region is less than a second threshold of gray level variance.

The first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point. The second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point. The first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point. The second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point. The reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

Specifically, the second pre-determined condition may be expressed as the following equation 3, the third pre-determined condition may be expressed as the following equation 4, the fourth pre-determined condition may be expressed as the following equation 5, and the fifth pre-determined condition may be expressed as the following equation 6.

$$\text{abs}(\text{Aver}RL - \text{Aver}PL) \leq \text{AverThresh}_1; \quad \text{equation 3:}$$

$$\text{abs}(\text{Aver}RR - \text{Aver}PR) \leq \text{AverThresh}_2; \quad \text{equation 4:}$$

$$\text{abs}(SDRL - SDPL) \leq SD\text{Thresh}_1; \text{ and} \quad \text{equation 5:}$$

$$\text{abs}(SDRR - SDPR) \leq SD\text{Thresh}_2. \quad \text{equation 6:}$$

AverPL represents the mean gray level of the first left horizontal region, AverRL represents the mean gray level of the second left horizontal region, AverPR represents the mean gray level of the first right horizontal region, AverRR represents the mean gray level of the second right horizontal region, SDPL represents the gray level variance of the first left horizontal region, SDRL represents the gray level variance of the second left horizontal region, SDPR represents the gray level variance of the first right horizontal region, SDRR represents the gray level variance of the second right horizontal region, AverThresh$_1$ represents the first threshold of mean gray level, AverThresh$_2$ represents the second threshold of mean gray level, SDThresh$_1$ represents the first threshold of gray level variance, SDThresh$_2$ represents the second threshold of gray level variance, and abs represents an operation of taking the absolute value.

For any one of the above regions, a mean gray level and a gray level variance of the region may be calculated based on equation 7 and equation 8:

$$\text{Aver} = (P_1 + P_2 + \ldots + P_n)/n; \text{ and} \quad \text{equation 7:}$$

$$SD = \sqrt{\Sigma(P_i - \text{Aver})^2/n}, i=1,2,\ldots,n. \quad \text{equation 8:}$$

Aver represents the mean gray level of the region, SD represents the gray level variance of the region, $P_1$ to $P_n$ represent gray values of various pixels in the region, and n represents the number of the pixels in the region.

It should be noted that, the first left horizontal region, the second left horizontal region, the first right horizontal region and the second right horizontal region are relative to the second noise point. If it is to be determined whether a brightness jump point is a second noise point, the above four regions are determined based on the brightness jump point, and then it is determined, based on the determined regions, whether the brightness jump point meets the second pre-determined condition, the third pre-determined condition, the fourth pre-determined condition and/or the fifth pre-determined condition.

Figure 4:
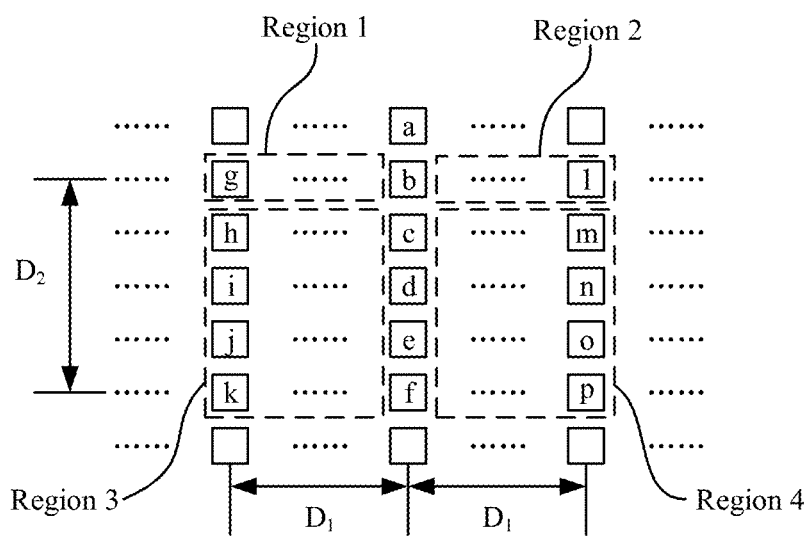
FIG. 4 is a schematic diagram of an example of a calculation region involved in filtering out noise points according to an embodiment of the present disclosure.

For example, in an image example shown in FIG. 4, each small square represents a pixel in the image. All of a, b, c, d, e and f are brightness jump points, D1 represents the second distance threshold, and D2 represents the third distance threshold. If it is to be determined whether b is a second noise point, reference jump points include c, d, e and f, region 1 is a first left horizontal region, region 2 is a first right horizontal region, region 3 is a second left horizontal region, and region 4 is a second right horizontal region.

It should be noted that, in some embodiments of the present disclosure, the step 202 may be: grouping the edge points and filtering out the noise points, by analyzing locations, gradients and gray level changes of various brightness jump points in the current image line by line, that is, achieving both filtering-out of the noise points and grouping of the edge points in one process of analyzing the current image line by line. For example, beginning with a bottom row in the current image (i.e., the row with the minimum vertical coordinates), for each brightness jump point in a current row which is being analyzed, it is determined whether the brightness jump point can meet the first pre-determined condition with at least one brightness jump point in the prior row and the next row, and whether the brightness jump point meets the second pre-determined condition, the third pre-determined condition, the fourth pre-determined condition and the fifth pre-determined condition. If the brightness jump point can not meet the first pre-determined condition with any brightness jump point in the prior row and the next row, the brightness jump point is filtered out as a first noise point. If the brightness jump point meets at least one of the second pre-determined condition, the third pre-determined condition, the fourth pre-determined condition and the fifth pre-determined condition, the brightness jump point is filtered out as a second noise point. If the brightness jump point can meet the first pre-determined condition with a brightness jump point in the prior row and the next row and the brightness jump point does not meet the second pre-determined condition, the third pre-determined condition, the fourth pre-determined condition and the fifth pre-determined condition, the brightness jump point is determined as an edge point and is grouped into a proper group.

In step 203, edge lines of the lane boundaries are recognized from edge lines.

It can be understood that, after the step 202 is performed, a connection line of edge points in each group forms one edge line. It is possible that not all of the edge lines are edge lines of the lane boundaries, and some messy line may be included. For example, possible messy lines in the edge lines include edge lines of objects such as lamp post, a telegraph pole and a lamp frame of another car. Therefore, for the edge lines obtained by grouping the edge points in the step 202, the edge lines of the lane boundaries can be recognized by filtering out the messy lines.

In the embodiment, the step 203 may be: grouping the edge points based on a pre-determined condition which is set in a system in advance.

For example, in some implementations of the embodiment, given that the edge lines of the lane boundary should have a proper length and a proper gradient angle and gray level deviations of regions at two sides of edge lines of the lane boundary are large, credibilities of edges line belonging to the lane boundary may be determined in a manner of confidence level and edge lines with high confidence levels are recognized as edge lines of the lane boundary. Specifically, the step 203 may be: recognizing edge lines meeting a sixth pre-determined condition from the edge lines, and determining them as the edge lines of the lane boundary. The sixth pre-determined condition is that: a confidence level of an edge line is greater than a confidence level threshold, where the confidence level of the edge line represents a probability of the edge line belonging to edge lines of the lane boundary, and the confidence level of the edge line is calculated based on a real length of the edge line, a gray level deviation between two horizontal sides of the edge line in the current image, and gradient angles of edge points of the edge line.

Further, the confidence level of the edge line may be specifically calculated based on equations 7 to 10.

$$C = K1 \times LengthC + K2 \times GrayContrastC + K3 \times GradientC; \quad \text{equation 7:}$$

$$LengthC = RLength \div LengthThresh \times 1000; \quad \text{equation 8:}$$

$$GrayContrastC = [abs(lineAverL - lineAverR)] \div GrayContrastThresh \times 1000; \quad \text{equation 9:}$$

$$GradientC = GradPoint\ Num \div SumPoint\ Num \times 1000. \quad \text{equation 10:}$$

C represents the confidence level of the edge line, LengthC represents a length confidence level of the edge line, GrayContrastC represents a confidence level of a gray level deviation between two sides of the edge line, GradientC represents a confidence level of a gradient angle of the edge line, and K1, K2 and K3 are pre-set proportion coefficients. RLength represents the length of the edge line, and LengthThresh represents a pre-set length threshold. lineAverL represent a mean gray level of a left region of the edge line, lineAverR represents a mean gray level of a right region of the edge line, and GrayContrastThresh represents a threshold of gray level deviation. GradPointNum represents the number of edge points on the edge line which meet a requirement for gradient, and SumPointNum represents the total number of edge points on the edge line. A gradient angle of an edge point on the edge line, which meets the requirement for gradient, is less than or equal to a pre-set threshold of gradient angle.

The left region of the edge line represents a region which is at a left side of the edge line and is within a pre-determined distance therefrom. Specifically, the left region of the edge line is a region consisting of a third left point, a vertical coordinate of the third left point and that of the edge point on the edge line are the same, a distance between a horizontal coordinate of the third left point and that of the edge point on the edge line is not greater than the third distance threshold, and the horizontal coordinate of the third left point is less than that of the edge point on the edge line.

The right region of the edge line represents a region which is at a right side of the edge line and is within a pre-determined distance therefrom. Specifically, the right region of the edge line is a region consisting of a third right point, a vertical coordinate of the third right point and that of the edge point on the edge line are the same, a distance between a horizontal coordinate of the third right point and that of the edge point on the edge line is not greater than the third distance threshold, and the horizontal coordinate of the third right point is greater than that of the edge point on the edge line.

Figure 5:
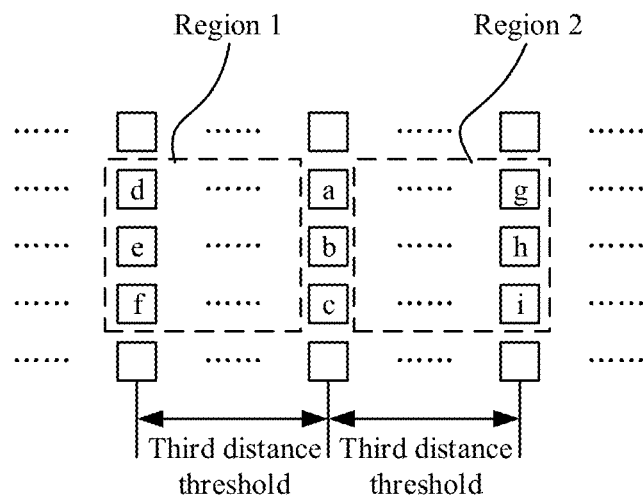
FIG. 5 is a schematic diagram of examples of a left region and a right region of an edge line according to an embodiment of the present disclosure.

For example, in an image example shown in FIG. 5, each small square represents a pixel in the image, and an edge line includes three edge points a, b and c. It can be seen from FIG. 5 that, a distance between a horizontal coordinate of a and that of d, a distance between the horizontal coordinate of a and that of g, a distance between a horizontal coordinate of b and that of e, a distance between the horizontal coordinate of b and that of h, a distance between a horizontal coordinate of c and that of f, and a distance between the horizontal coordinate of c and that of i are all equal to the third distance threshold. It can be seen that, region 1 is a left region of the edge line, and region 2 is a right region of the edge line.

As another example, in some other implementations of the embodiment, given that angles between the edge lines of a lane boundary and a known lane marking line should be small, the edge lines of the lane boundary may be recognized based on the angles between the edge lines and the lane marking line. Specifically, the step 203 may be: recognizing edge lines meeting a seventh pre-determined condition from the edge lines as the edge lines of the lane boundary. The seventh pre-determined condition is that: an angle in a three-dimensional coordinate system between a lane marking line recognized from the current image and an edge line is less than an angle threshold. It can be understood that, in the embodiment, the lane marking line in the current image may be recognized in any recognition manner. For example, a way of recognizing a lane marking line from a lane image has been provided in the conventional technology, which is not described in the embodiment.

It should be noted that, in some other implementations of the embodiment, the edge lines of the lane boundary may be recognized based on both the sixth pre-determined condition and the seventh pre-determined condition. Specifically, the step 203 may be: recognizing edge lines meeting the sixth pre-determined condition and the seventh pre-determined condition from the edge lines as the edge lines of the lane boundary.

In step 204, the edge lines of the lane boundary are grouped, and edge lines in each group are recognized as edge lines of one lane boundary, where a difference between horizontal coordinates of two edge lines in the same group is less than a second distance threshold.

It can be understood that, given that a horizontal distance between edge lines of one lane boundary should meet an actual limitation standard, therefore, in a case that it is determined that a difference between horizontal coordinates of two edge lines is less than the second distance threshold, the two edge lines may be put into the same group. Edge lines in the same group are edge lines belonging to the same lane boundary, that is, a region formed by edge lines in the same group is a region of one lane boundary.

After a lane boundary is recognized, a region of the lane boundary may be marked in the current image and the image may be displayed, to assist a driver to drive.

It should be noted that, lane boundaries include lane marking lines, curbs and guardrails, the lane marking lines are zones in which vehicles can run, and the curbs and the guardrails are zones in which vehicles can not run. Therefore, in order to further facilitate the driver to distinguish different driving zones, a curb and/or a guardrail may be further recognized from the lane boundaries after the lane boundaries are recognized.

In some implementations of the embodiment, given that a curb usually has three arrises, a land boundary region including three edge lines may be recognized as a curb region. Specifically, after the step 204, the embodiment may further include: recognizing a lane boundary meeting an eighth pre-determined condition as a curb. The eighth pre-determined condition is that: a lane boundary includes three edge lines, a horizontal distance between every two adjacent edge lines is less than a fifth distance threshold, and a horizontal distance between a leftmost edge line and a rightmost edge line of the lane boundary is less than a sixth distance threshold.

In some other implementations of the embodiment, given that a side of a curb is a road and the other side is a non-driving zone such as the grass, i.e., a smooth region being located at an exterior side of an edge line of the curb and a jump region being located at an exterior side of the other edge line, therefore, for a lane boundary only having two edge lines, a curb region can be recognized based on gray levels of regions at exterior sides of the two edge lines of the lane boundary. Specifically, after the step 204, the embodiment may further include: recognizing a lane boundary meeting a ninth pre-determined condition and a lane boundary meeting a tenth pre-determined condition as curbs. The ninth pre-determined condition is that: a lane boundary includes two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance. The tenth pre-determined condition is that: a lane boundary includes two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance.

The left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary. The right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

Figure 6:
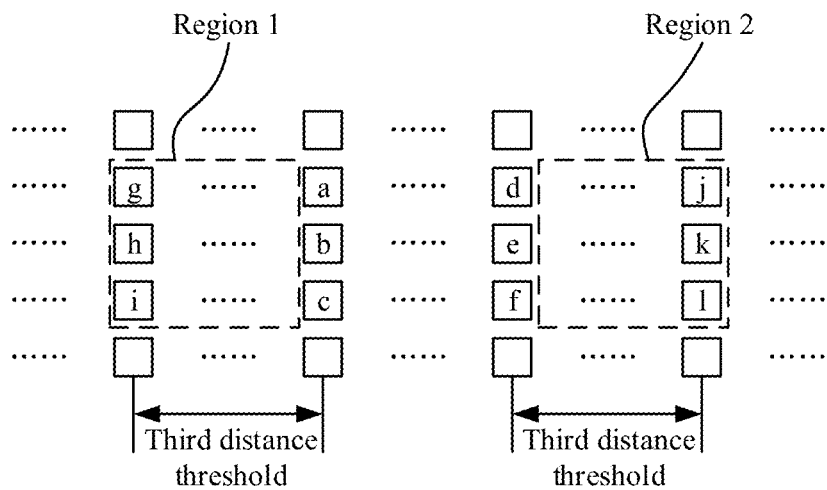
FIG. 6 is a schematic diagram of examples of a left region and a right region of a lane boundary according to an embodiment of the present disclosure.

For example, in an image example shown in FIG. 6, each small square represents a pixel in the image; and for a lane boundary, three edge points a, b and c constitute a left edge line of the lane boundary, and three edge points d, e and f constitute a right edge line of the lane boundary. It can be seen from FIG. 6 that, vertical coordinates of a and g are the same, and a distance between horizontal coordinates of a and g is the third distance threshold; vertical coordinates of b and h are the same, and a distance between horizontal coordinates of b and h is the third distance threshold; vertical coordinates of c and i are the same, and a distance between horizontal coordinates of c and i is the third distance threshold; in addition, the horizontal coordinate of a is greater than that of g, the horizontal coordinate of b is greater than that of h, and the horizontal coordinate of c is greater than that of i. Therefore, region 1 is a left region of the lane boundary. Similarly, vertical coordinates of d and j are the same, and a distance between horizontal coordinates of d and j is the third distance threshold; vertical coordinates of e and k are the same, and a distance between horizontal coordinates of e and k is the third distance threshold; vertical coordinates of f and l are the same, and a distance between horizontal coordinates of f and l is the third distance threshold; in addition, the horizontal coordinate of d is less than that of j, the horizontal coordinate of e is less than that of k, and the horizontal coordinate of f is less than that of l. Therefore, region 2 is a right region of the lane boundary.

It can be understood that, the left edge line of the lane boundary consists of a left edge point, and the right edge line of the lane boundary consists of a right edge point. For an edge point, if a mean gray level of a left region of the edge point is not greater than a mean gray value of a right region of the edge point and gray level variances at a left side and a right side of the edge point are not greater than a threshold, the edge point is a left edge point. If the mean gray level of the left region of the edge point is not less than the mean gray level of the right region of the edge point and the gray level variances at the left side and the right side of the edge point are not greater than the threshold, the edge point is a right edge point.

It should be noted that, in some other implementations of the embodiment, edge lines of the lane boundary may be recognized based on all of the eighth pre-determined condition, the ninth pre-determined condition and the tenth pre-determined condition. Specifically, the embodiment may further include: recognizing a lane boundary meeting the eighth pre-determined condition, a lane boundary meeting the ninth pre-determined condition and a lane boundary meeting the tenth pre-determined condition as curbs.

In some implementations of the embodiment, given that a guardrail has arris information different from that of a curb and that of a lane marking line, the guardrail may be recognized from the lane boundaries based on a machine learning method. Specifically, the embodiment may further include: recognizing a recognition region including the lane boundary in the current image based on a trained machine learning model, to recognize a lane boundary belonging to the guardrail; where the machine learning model is trained based on an image of a known guardrail and an image of an object that is not a guardrail. The object that is not a guardrail is an object that may appear in a lane image, which does not belong to a guardrail, such as a lane marking line, a curb, a pedestrian, a street lamp or a road surface.

Further, in order to simplify a calculation for the process of detecting the lane boundaries to reduce calculation resources and time to be consumed in the process of detecting the lane boundaries, a recognition region with a proper size may be selected as a recognition object of the machine learning model from the current image based on a lane boundary region in the process of recognizing the guardrail based on the machine learning model, and then it is determined whether the lane boundary is the guardrail based on a recognition result of the recognition region. Specifically, in the embodiment, the way of recognizing the guardrail from the lane boundary based on the machine learning model may include step A, step B and step C specifically.

In step A, each lane boundary in the current image is determined as a recognition target, and at least one recognition region including the recognition target is selected from the current image based on a location of the recognition target in the current image.

For a lane boundary, a location of a recognition region may be determined based on equations 11 to 14 by using an edge line of the lane boundary, which is the closest to a vehicle, as a baseline. It is assumed that n recognition regions are required to be selected for one lane boundary, then equations 11 to 14 may be expressed as:

$$\text{Index} = i \times (\text{SumPoint Num} \div n), i=0,1,\ldots,n-1; \quad \text{equation 11:}$$

$$\text{recty} = \text{BaselinePoint}(\text{Index})y - \text{Height} \times 3 \div 4; \quad \text{equation 12:}$$

$$\text{rectx} = (\text{recty} - \text{Baseline}fB) \div \text{baseline}fK; \text{ and} \quad \text{equation 13:}$$

$$\text{rectwidth} = \text{Width}, \text{rectheight} = \text{Height}. \quad \text{equation 14:}$$

Index represents a sequence number of a base point in edge points on the baseline based on vertical coordinates, i represents a sequence number of a recognition region, and SumPointNum represents the number of the edge points on the baseline. recty represents a reference vertical coordinate of the recognition region, rectx represents a reference horizontal coordinate of the recognition region, rectwidth represents a width of the recognition region, rectheight represents a height of the recognition region, and rectx, recty, rectwidth and rectheight may be used to determine the recognition region. BaselinePoint(Index)y represents a vertical coordinate of the base point, BaselinefB represents an intercept of the baseline, BaselinefK represents a slope of the baseline, Width represents a pre-set width, and Height represents a pre-set height.

It can be understood that, one base point on the baseline corresponds to one index, and one index corresponds to one recognition region. Hence, one recognition region corresponds to one base point on the baseline.

Figure 7:
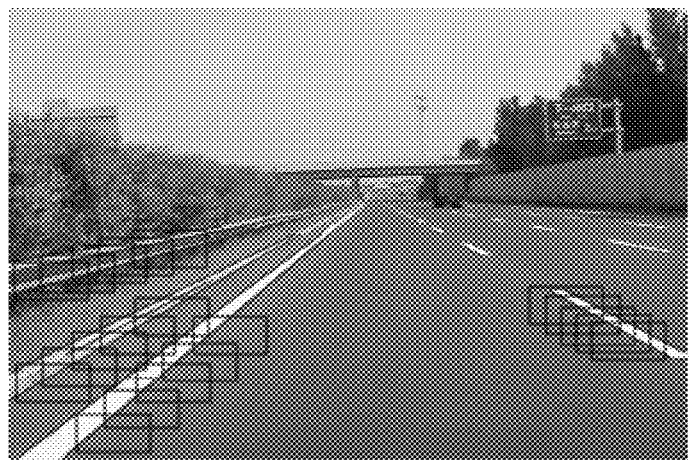
FIG. 7 is a schematic diagram of an example of selecting recognition regions for recognizing a guardrail according to an embodiment of the present disclosure.

For example, in a lane image shown in FIG. 7, 5 recognition regions are selected on each lane boundary to recognize a guardrail.

In step B, each recognition region is recognized based on the machine learning model, to determine whether the each recognition region is a region including the guardrail.

It can be understood that, the machine learning model may perform Haar-Like characteristic recognition on the recognition region, to determine whether the recognition region includes the guardrail.

In step C, the recognition target is determined as the guardrail if a ratio of the number of regions including the guardrail to the number of the recognition regions including the recognition target exceeds a ratio threshold.

It can be understood that, for a lane boundary, multiple recognition regions may be selected to perform recognition, where each recognition region corresponds to a recognition result. Some of the recognition regions may be recognized as regions including the guardrail, and some of the recognition regions may be recognized as regions which do not include the guardrail. In order to determine whether the lane boundary is the guardrail, it may be determined based on the number of recognition regions which are recognized to include the guardrail. Specifically, for multiple recognition regions of a lane boundary, the lane boundary may be determined as a guardrail if equation 15 is met.

$$(GroupSelectNum/GroupRectNum) \geq Thresh. \quad \text{Equation 15:}$$

GroupSelectNum represents the number of recognition regions which are recognized to include the guardrail, GroupRectNum represents the total number of the recognition regions selected on the lane boundary, and Thresh represents the ratio threshold.

It should be noted that, the curb can not only be recognized from the lane boundaries based on the eighth pre-determined condition, the ninth pre-determined condition and the tenth pre-determined condition, but also can be recognized, after a guardrail and a lane marking line are recognized from the lane boundaries, from remaining lane boundaries based on the guardrail and the lane marking line which have been recognized. Given that there are usually curbs between a lane marking line and a guardrail, in some implementations of the embodiment, the method may further include: recognizing a lane boundary meeting an eleventh pre-determined condition as a curb in a case that the lane marking line and the guardrail have been recognized from the lane boundaries in the current image. The eleventh pre-determined condition is that: a lane boundary is located between the lane marking line and the guardrail, and a distance between horizontal coordinates of two edge lines of the lane boundary is less than the seventh distance threshold. It can be understood that, in the current image, the guardrail may be recognized with an above-described recognition method in the embodiment. In addition, in the embodiment, the lane marking line in the current image may be recognized with any recognition method. For example, a way of recognizing a lane marking line from a lane image has been provided in the conventional technology, which is not described in the embodiment.

In addition, in some implementations of the embodiment, after the lane boundaries in the current image are recognized, the lane boundaries in the current image may be distinguished as a lane marking line, a guardrail and/or a curb based on locations of a curb, a guardrail and a lane marking line in historical images.

It can be understood that, the above-described implementations of distinguishing the lane boundaries as the curb, the guardrail and the lane marking line in the embodiment may be used synthetically, to distinguish a type of a lane boundary completely. For example, after the lane boundaries are recognized in the step 204, the curb is recognized from the lane boundaries base on the eighth pre-determined condition, the ninth pre-determined condition and the tenth pre-determined condition, the guardrail is recognized from the lane boundaries based on the machine learning model, and the lane marking line is recognized in the current image; and then, for remaining lane boundaries, a type of which is not recognized, a curb is inferred based on the guardrail and the lane marking line which have been recognized.

After the lane boundaries are distinguished as the curb, the guardrail and the lane marking line, a region of the curb, a region of the guardrail and the lane marking line may be marked and displayed in the current image in different manners, to assist the driver to distinguish the curb, the guardrail and the lane marking line.

Figure 8:
FIG. 8 is a current image involved in an example of an application scenario according to an embodiment of the present disclosure.
Figure 9:
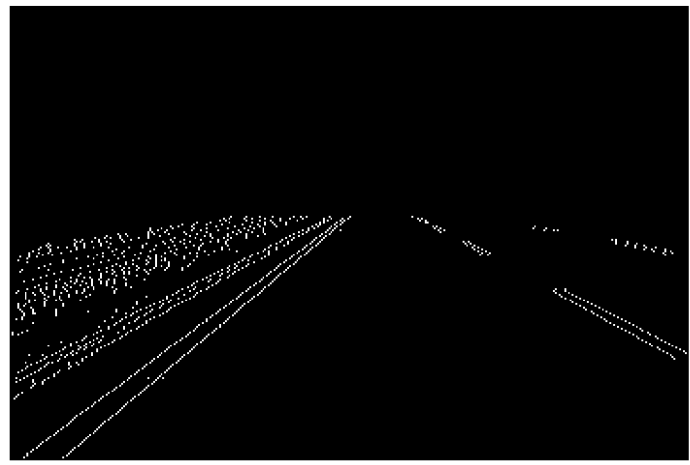
FIG. 9 is an image of extracting brightness jump points involved in an example of an application scenario according to an embodiment of the present disclosure.
Figure 10:
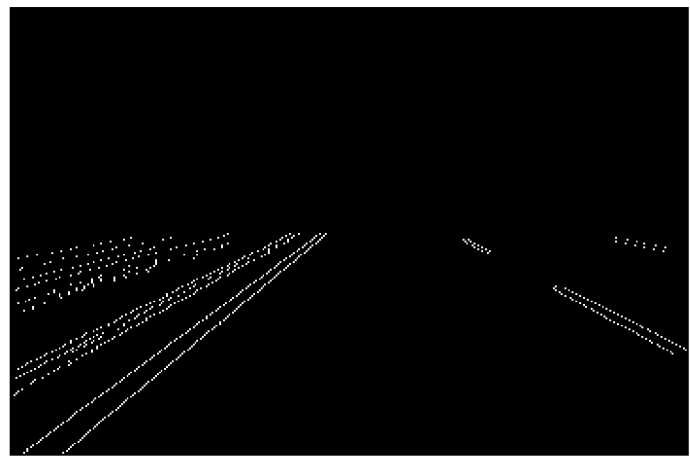
FIG. 10 is an image of groups of edge points involved in an example of an application scenario according to an embodiment of the present disclosure.
Figure 11:
FIG. 11 is an image of recognizing lane boundaries involved in an example of an application scenario according to an embodiment of the present disclosure.

In order to enable those skilled in the art to understand the image processing process in the embodiment more clearly, an application scenario is taken as an example for description. In the application scenario, a current image is shown in FIG. 8, an image of brightness jump points obtained by filtering in the step 201 is shown in FIG. 9, an image of brightness jump points obtained after filtering out noise points and grouping edge points in the step 202 is shown in FIG. 10, and an image of lane boundaries identifiers obtained after grouping edge lines in the step 204 is shown in FIG. 11.

In the technical solutions in the embodiment, for the current image of the lane, the brightness jump points in the current image may be extracted by filtering the current image, the noise points may be filtered out based on location information of the brightness jump points, and remaining brightness jump points are determined as the edge points to form the groups, where edge points in each of the groups can form one edge line. In this way, edge lines belonging to the same lane boundary can be determined based on a distance between the edge lines. The edge lines of the lane boundary can mark a region of the lane boundary in the current image, so that detection of the lane boundary is realized. It can be seen that, since there is no need to perform analysis and recognition on the entire image with a machine learning model during detecting the lane boundaries, a calculation for the process of detecting the lane boundaries is simpler, and calculation resources and time consumed in the process of detecting the lane boundaries are reduced. Therefore, the lane boundaries can be detected accurately and quickly.

Figure 12:
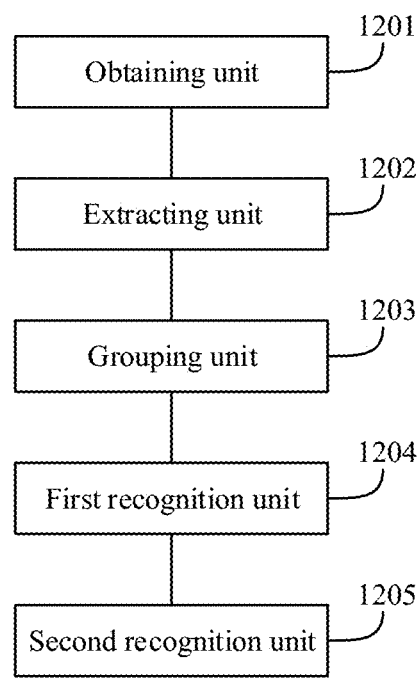
FIG. 12 is a schematic structural diagram of an apparatus for detecting lane boundaries according to an embodiment of the present disclosure.

Reference is made to FIG. 12, which shows a schematic structural diagram of an apparatus for detecting lane boundaries according to an embodiment of the present disclosure. In the embodiment, the apparatus may include:

an obtaining unit 1201, configured to obtain a current image of a lane;

an extracting unit 1202, configured to extract brightness jump points in the current image by filtering the current image;

a grouping unit 1203, configured to filter out noise points from the brightness jump points, and determine remaining brightness jump points as edge points to form groups of the edge points, where two edge points meeting a first pre-determined condition are in the same group, the first pre-determined condition includes that vertical coordinates of two points are adjacent and a distance difference between horizontal coordinates of the two points is less than a first distance threshold, the noise points include a first noise point, the first noise point does not meet the first pre-determined condition with any one of other brightness jump points, and a connection line of edge points in the same group forms one edge line;

a first recognition unit 1204, configured to recognize edge lines of the lane boundaries from edge lines; and a second recognition unit 1205, configured to group the edge lines of the lane boundaries, and recognize edge lines in each group as edge lines of one lane boundary, where a difference between horizontal coordinates of two edge lines in the same group is less than a second distance threshold.

Optionally, the first pre-determined condition further includes that a gradient angle between the two points is less than a threshold of gradient angle.

Optionally, the noise points may further include a second noise point, and the second noise point meets at least one of the following pre-determined conditions:

a second pre-determined condition being that: a difference between a mean gray level of a first left horizontal region and a mean gray level of a second left horizontal region is less than a first threshold of mean gray level;

a third pre-determined condition being that: a difference between a mean gray level of a first right horizontal region and a mean gray level of a second right horizontal region is less than a second threshold of mean gray level;

a fourth pre-determined condition being that: a difference between a gray level variance of a first left horizontal region and a gray level variance of a second left horizontal region is less than a first threshold of gray level variance;

a fifth pre-determined condition being that: a difference between a gray level variance of a first right horizontal region and a gray level variance of a second right horizontal region is less than a second threshold of gray level variance;

the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;

the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;

the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;

the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

Optionally, the first recognition unit 1204 may be specifically configured to: recognize edge lines meeting a sixth pre-determined condition and/or a seventh pre-determined condition from the edge lines as the edge lines of the lane boundary;

the sixth pre-determined condition is that: a confidence level of an edge line is greater than a confidence level threshold, where the confidence level of the edge line represents a probability of the edge line belonging to the edge lines of the lane boundary, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

Optionally, the apparatus may further include: a third recognition unit, configured to recognize a lane boundary meeting an eighth pre-determined condition, a lane boundary meeting a ninth pre-determined condition and/or a lane boundary meeting a tenth pre-determined condition as curbs;

where the eighth pre-determined condition is that: a lane boundary includes three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary includes two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary includes two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

Optionally, the apparatus may further include: a fourth recognition unit, configured to recognize a recognition region including the lane boundary in the current image based on a trained machine learning model to recognize a lane boundary belonging to a guardrail; where the machine learning model is trained based on an image of a guardrail and an image of an object that is not a guardrail.

Optionally, the fourth recognition unit includes:

a selecting subunit, configured to determine each lane boundary in the current image as a recognition target respectively, and select at least one recognition region including the recognition target from the current image based on a location of the recognition target in the current image;

a first determining subunit, configured to recognize each recognition region based on the machine learning model, to determine whether the each recognition region is a region including the guardrail; and a second determining subunit, configured to determine the recognition target as the guardrail if a ratio of the number of regions including the guardrail to the number of the recognition regions including the recognition target exceeds a ratio threshold.

Optionally, on the basis that the apparatus includes the fourth recognition unit described above, the apparatus may further include: a fifth recognition unit, configured to recognize a lane boundary meeting an eleventh pre-determined condition as a curb in a case that the lane marking line and the guardrail have been recognized from the lane boundaries in the current image; where the eleventh pre-determined condition is that: a lane boundary is located between the lane marking line and the guardrail, and a distance between horizontal coordinates of two edge lines of the lane boundary is less than a seventh distance threshold.

Optionally, the apparatus may further include: a distinguishing unit, configured to distinguish the lane boundary in the current image as a lane marking line, a guardrail and/or a curb based on locations of a curb, a guardrail and a lane marking line in historical images.

Based on the technical solution in the embodiment, since there is no need to perform analysis and recognition on the entire image with a machine learning model during detecting the lane boundaries, a calculation for the process of detecting the lane boundaries is simpler, and calculation resources and time consumed in the process of detecting the lane boundaries are reduced. Therefore, the lane boundary can be detected accurately and quickly.

Figure 13:
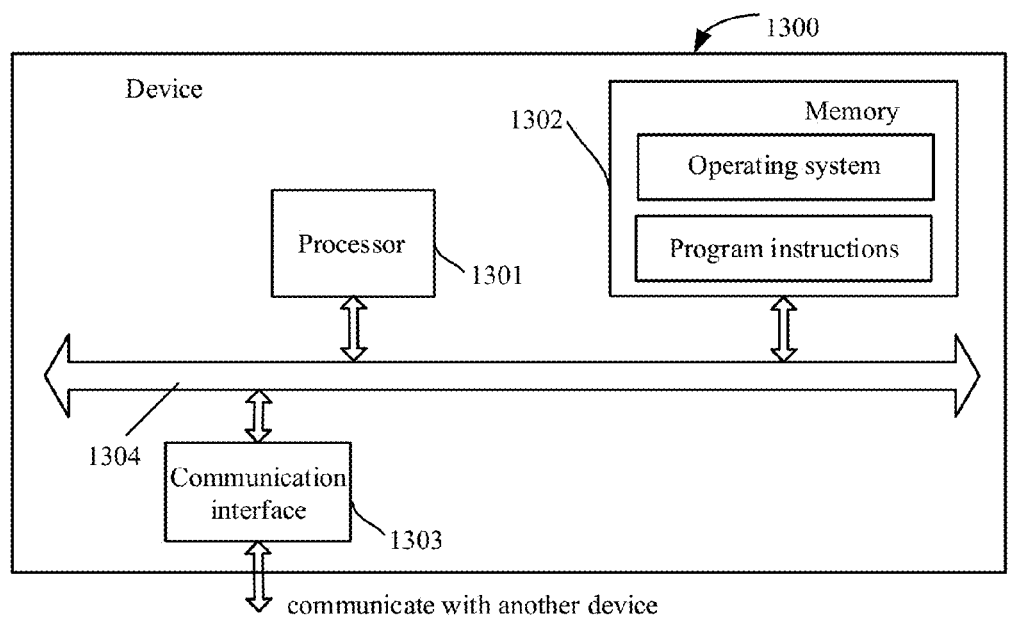
FIG. 13 is a schematic structural diagram of a device for detecting lane boundaries according to an embodiment of the present disclosure.

Reference is made to FIG. 13, which shows a schematic structural diagram of a device for detecting lane boundaries according to an embodiment of the present disclosure. In the embodiment, the device 1300 may include a processor 1301, a memory 1302, a communication interface 1303 and a bus system 1304.

The bus system 1304 is configured to couple various hardware components of the device together;

The communication interface 1303 is configured to achieve a communication connection between the device and at least one of other devices;

The memory 1302 is configured to store program instructions and data;

The processor 1301 is configured to read the instructions and the data stored in the memory 1302, to perform the following operations:

obtaining a current image of a lane, and extracting brightness jump points in the current image by filtering the current image;

filtering out noise points from the brightness jump points, and determining remaining brightness jump points as edge points to form groups of the edge points, where two edge points meeting a first pre-determined condition are in the same group, the first pre-determined condition includes that vertical coordinates of two points are adjacent and a distance difference between horizontal coordinates of the two points is less than a first distance threshold, the noise points include a first noise point, the first noise point does not meet the first pre-determined condition with any one of other brightness jump points, and a connection line of edge points in the same group forms one edge line;

recognizing edge lines of the lane boundaries from edge lines; and grouping the edge lines of the lane boundaries, and recognizing edge lines in each group as edge lines of one lane boundary, where a difference between horizontal coordinates of two edge lines in the same group is less than a second distance threshold.

Optionally, the first pre-determined condition further includes that a gradient angle between the two points is less than a threshold of gradient angle.

Optionally, the noise points further include a second noise point, and the second noise point meets at least one of the following pre-determined conditions:

a second pre-determined condition being that: a difference between a mean gray level of a first left horizontal region and a mean gray level of a second left horizontal region is less than a first threshold of mean gray level;

a third pre-determined condition being that: a difference between a mean gray level of a first right horizontal region and a mean gray level of a second right horizontal region is less than a second threshold of mean gray level;

a fourth pre-determined condition being that: a difference between a gray level variance of a first left horizontal region and a gray level variance of a second left horizontal region is less than a first threshold of gray level variance;

a fifth pre-determined condition being that: a difference between a gray level variance of a first right horizontal region and a gray level variance of a second right horizontal region is less than a second threshold of gray level variance;

the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;

the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;

the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;

the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

Optionally, in order to recognize the edge lines of a lane boundary from the edge lines, the processor 1301 may specifically perform the following operations:

recognizing edge lines meeting a sixth pre-determined condition and/or a seventh pre-determined condition from the edge lines as the edge lines of the lane boundary;

the sixth pre-determined condition is that: a confidence level of an edge line is greater than a confidence level threshold, where the confidence level of the edge line represents a probability of the edge line belonging to the edge lines of the lane boundary, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

Optionally, the processor 1301 may further perform the following operations:

recognizing a lane boundary meeting an eighth pre-determined condition, a lane boundary meeting a ninth pre-determined condition and/or a lane boundary meeting a tenth pre-determined condition as curbs;

where the eighth pre-determined condition is that: a lane boundary includes three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary includes two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary includes two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

Optionally, the processor 1301 may further perform the following operations: recognizing a recognition region including the lane boundary in the current image based on a trained machine learning model to recognize a lane boundary belonging to a guardrail; where the machine learning model is trained based on an image of a guardrail and an image of an object that is not a guardrail.

Optionally, in order to recognize the lane boundary belonging to the guardrail, the processor 1301 may specifically perform the following operations:

determining each lane boundary in the current image as a recognition target respectively, and selecting at least one recognition region including the recognition target from the current image based on a location of the recognition target in the current image;

recognizing each recognition region based on the machine learning model, to determine whether the each recognition region is a region including the guardrail; and determining the recognition target as the guardrail if a ratio of the number of regions including the guardrail to the number of the recognition regions including the recognition target exceeds a ratio threshold.

Optionally, the processor 1301 may further perform the following operations: recognizing a lane boundary meeting an eleventh pre-determined condition as a curb in a case that the lane marking line and the guardrail have been recognized from the lane boundaries in the current image; where the eleventh pre-determined condition is that: a lane boundary is located between the lane marking line and the guardrail, and a distance between horizontal coordinates of two edge lines of the lane boundary is less than a seventh distance threshold.

Optionally, the processor 1301 may further perform the following operations: distinguishing the lane boundaries in the current image as a lane marking line, a guardrail and/or a curb based on locations of a curb, a guardrail and a lane marking line in historical images.

Based on the technical solution in the embodiment, since there is no need to perform analysis and recognition on the entire image with a machine learning model during detecting the lane boundaries, a calculation for the process of detecting the lane boundaries is simpler, and calculation resources and time consumed in the process of detecting the lane boundaries are reduced. Therefore, the lane boundaries can be detected accurately and quickly.

"The first" in names such as "the first pre-determined condition" and "the first noise point" is merely used as a name identifier and does not represent the first one in a sequence. This rule is also applicable to "the second", "the third" and so on.

Based on the descriptions of the above implementations, those skilled in the art can clearly understand that all or some of the steps in the method according to the above embodiments may be implemented by software and a common hardware platform. Based on this understanding, the technical solutions in the present disclosure may be implemented in a form of a software product, and the computer software product may be stored in a storage medium, such as a read-only memory (ROM)/RAM, a magnetic disk or an optical disk, including several instructions to enable a computer device (which may be a personal computer, a server or a network communication device such as a router) to execute the method according to the various embodiments of the present disclosure or according to some sections of the embodiments.

The various embodiments of the present disclosure are described in a progressive way, reference can be made to each other for understanding the same or similar sections, and differences from other embodiments are emphatically illustrated in each of the embodiments. Especially, the method embodiments and the device embodiments are described briefly since they are basically similar to the system embodiments, and reference can be made to some descriptions of the system embodiments for understanding related sections. The device embodiments and the system embodiments described above are illustrative only. The modules described as separated components may be or may not be physically separated. A component displayed as a module may be or may not be a physical module, that is, the component may be located at one place or may be distributed onto multiple network units. Some or all of the modules may be selected based on actual needs to achieve the objective of solutions in the embodiments. Those skilled in the art can understand and implement the solutions without any creative efforts.

The above are only preferred embodiments of the present disclosure and do not limit the protection scope of the present disclosure. It should be noted that, for those skilled in the art, changes and modifications can be made without departing from the present disclosure, and the changes and modifications should be considered within the protection scope of the present disclosure.

The invention claimed is:

1. A method for detecting lane boundaries comprising:
   obtaining a current image of a lane, and extracting brightness jump points in the current image by filtering the current image;
   filtering out noise points from the brightness jump points, determining remaining brightness jump points as edge points, and grouping the edge points based on a first pre-determined condition, wherein any two of the edge points meeting the first pre-determined condition are in the same group, the first pre-determined condition comprises that vertical coordinates of the any two of the edge points are adjacent and a distance difference between horizontal coordinates of the any two of the edge points is less than a first distance threshold, the noise points comprise a first noise point and the first noise point is a brightness jump point that does not meet the first pre-determined condition with any one of other brightness jump points, and a connection line of any two of the edge points in the same group forms one edge line;
   recognizing edge lines of lane boundaries from the edge lines; and
   grouping the edge lines of lane boundaries, and recognizing the edge lines in each group as edge lines of one lane boundary respectively, wherein a difference between horizontal coordinates of any two of the edge lines of lane boundaries that is less than a second distance threshold is put into the same group.

2. The method according to claim 1, wherein the first pre-determined condition further comprises that a gradient angle between the any two of the edge points is less than a threshold of gradient angle;
   and/or
   the noise points further comprise a second noise point, and the second noise point meets at least one of the following pre-determined conditions:
   a second pre-determined condition being that: a difference between a mean gray level of a first left horizontal region and a mean gray level of a second left horizontal region is less than a first threshold of mean gray level;
   a third pre-determined condition being that: a difference between a mean gray level of a first right horizontal region and a mean gray level of a second right horizontal region is less than a second threshold of mean gray level;
   a fourth pre-determined condition being that: a difference between a gray level variance of a first left horizontal region and a gray level variance of a second left horizontal region is less than a first threshold of gray level variance;
   a fifth pre-determined condition being that: a difference between a gray level variance of a first right horizontal region and a gray level variance of a second right horizontal region is less than a second threshold of gray level variance;
   wherein, the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;
   the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;
   the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;
   the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

3. The method according to claim 1, wherein the recognizing edge lines of the lane boundaries from edge lines specifically comprises: recognizing edge lines meeting a sixth pre-determined condition and/or a seventh pre-determined condition from the edge lines as the edge lines of the lane boundaries;

the sixth pre-determined condition is that: a confidence level of an edge line is greater than a confidence level threshold, the confidence level of the edge line represents a probability of the edge line belonging to the edge lines of the lane boundaries, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

4. The method according to claim 1, further comprising: recognizing a lane boundary meeting an eighth pre-determined condition, a lane boundary meeting a ninth pre-determined condition and/or a lane boundary meeting a tenth pre-determined condition as curbs;

wherein the eighth pre-determined condition is that: a lane boundary comprises three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary comprises two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary comprises two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

5. The method according to claim 1, further comprising: recognizing a recognition region comprising the lane boundary in the current image based on a trained machine learning model to recognize a lane boundary belonging to a guardrail; wherein the machine learning model is trained based on an image of a guardrail and an image of an object that is not a guardrail.

6. The method according to claim 5, wherein the recognizing a recognition region comprising the lane boundary in the current image based on a trained machine learning model to recognize a lane boundary belonging to a guardrail comprises:

determining each lane boundary in the current image as a recognition target respectively, and selecting at least one recognition region comprising the recognition target from the current image based on a location of the recognition target in the current image;

recognizing each recognition region based on the machine learning model, to determine whether the each recognition region is a region comprising the guardrail; and determining the recognition target as the guardrail if a ratio of the number of regions comprising the guardrail to the number of the recognition regions comprising the recognition target exceeds a ratio threshold.

7. The method according to claim 5, further comprising: recognizing a lane boundary meeting an eleventh pre-determined condition as a curb in a case that the lane marking line and the guardrail have been recognized from the lane boundaries in the current image; wherein the eleventh pre-determined condition is that: a lane boundary is located between the lane marking line and the guardrail, and a distance between horizontal coordinates of two edge lines of the lane boundary is less than a seventh distance threshold.

8. The method according to claim 1, further comprising: distinguishing the lane boundary in the current image as a lane marking line, a guardrail and/or a curb based on locations of a curb, a guardrail and a lane marking line in historical images.

9. An apparatus for detecting lane boundaries comprising:
an obtaining unit, configured to obtain a current image of a lane;
an extracting unit, configured to extract brightness jump points in the current image by filtering the current image;
a grouping unit, configured to filter out noise points from the brightness jump points, determine remaining brightness jump points as edge points, and group the edge points based on a first pre-determined condition, wherein any two of the edge points meeting the first pre-determined condition are in the same group, the first pre-determined condition comprises that vertical coordinates of any two of the edge points are adjacent and a distance difference between horizontal coordinates of the any two of the edge points is less than a first distance threshold, the noise points comprise a first noise point and the first noise point is a brightness jump point that does not meet the first pre-determined condition with any one of other brightness jump points, and a connection line of edge points in the same group forms one edge line;

a first recognition unit, configured to recognize edge lines of lane boundaries from the edge lines; and a second recognition unit, configured to group the edge lines of lane boundaries, and recognize the edge lines in each group as edge lines of one lane boundary, wherein a difference between horizontal coordinates of any two of the edge lines of lane boundaries that is less than a second distance threshold is put into the same group.

10. The apparatus according to claim 9, wherein the first pre-determined condition further comprises that a gradient angle between the any two of the edge points is less than a threshold of gradient angle;

and/or the noise points further comprise a second noise point, and the second noise point meets at least one of the following pre-determined conditions:

a second pre-determined condition being that: a difference between a mean gray level of a first left horizontal region and a mean gray level of a second left horizontal region is less than a first threshold of mean gray level;

a third pre-determined condition being that: a difference between a mean gray level of a first right horizontal region and a mean gray level of a second right horizontal region is less than a second threshold of mean gray level;

a fourth pre-determined condition being that: a difference between a gray level variance of a first left horizontal region and a gray level variance of a second left horizontal region is less than a first threshold of gray level variance;

a fifth pre-determined condition being that: a difference between a gray level variance of a first right horizontal region and a gray level variance of a second right horizontal region is less than a second threshold of gray level variance;

wherein, the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;

the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;

the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;

the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

11. The apparatus according to claim 9, wherein the first recognition unit is further configured to recognize edge lines meeting a sixth pre-determined condition and/or a seventh pre-determined condition from the edge lines as the edge lines of the lane boundaries;

the sixth pre-determined condition is that: a confidence level of an edge line is greater than a confidence level threshold, the confidence level of the edge line represents a probability of the edge line belonging to the edge lines of the lane boundaries, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

12. The apparatus according to claim 9, further comprising:

a third recognition unit, configured to recognize a lane boundary meeting an eighth pre-determined condition, a lane boundary meeting a ninth pre-determined condition and/or a lane boundary meeting a tenth pre-determined condition as curbs;

wherein the eighth pre-determined condition is that: a lane boundary comprises three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary comprises two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary comprises two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

13. The apparatus according to claim 9, further comprising:

a fourth recognition unit, configured to recognize a recognition region comprising the lane boundary in the current image based on a trained machine learning model to recognize a lane boundary belonging to a guardrail; wherein the machine learning model is trained based on an image of a guardrail and an image of an object that is not a guardrail.

14. The apparatus according to claim 13, wherein the fourth recognition unit comprises:

a selecting subunit, configured to determine each lane boundary in the current image as a recognition target respectively, and select at least one recognition region comprising the recognition target from the current image based on a location of the recognition target in the current image;

a first determining subunit, configured to recognize each recognition region based on the machine learning model, to determine whether the each recognition region is a region comprising the guardrail; and a second determining subunit, configured to determine the recognition target as the guardrail if a ratio of the number of regions comprising the guardrail to the number of the recognition regions comprising the recognition target exceeds a ratio threshold.

15. The apparatus according to claim 13, further comprising:

a fifth recognition unit, configured to recognize a lane boundary meeting an eleventh pre-determined condition as a curb in a case that the lane marking line and the guardrail have been recognized from the lane boundaries in the current image; wherein the eleventh pre-determined condition is that: a lane boundary is located between the lane marking line and the guardrail, and a distance between horizontal coordinates of two edge lines of the lane boundary is less than a seventh distance threshold.

16. The apparatus according to claim 9, further comprising:

a distinguishing unit, configured to distinguish the lane boundary in the current image as a lane marking line, a guardrail and/or a curb based on locations of a curb, a guardrail and a lane marking line in historical images.

17. A device for detecting lane boundaries comprising a processor, a memory, a communication interface and a bus system;

wherein the bus system is configured to couple various hardware components of the device together;

the communication interface is configured to achieve a communication connection between the device and at least one of other devices;

the memory is configured to store program instructions and data; and the processor is configured to read the program instructions and the data stored in the memory, to perform the following operations:

obtaining a current image of a lane, and extracting brightness jump points in the current image by filtering the current image;

filtering out noise points from the brightness jump points, determining remaining brightness jump points as edge points, and grouping the edge points based on a first pre-determined condition, wherein any two of the edge points meeting the first pre-determined condition are in the same group, the first pre-determined condition comprises that vertical coordinates of any two of the edge points are adjacent and a distance difference between horizontal coordinates of the any two of the edge points is less than a first distance threshold, the noise points comprise a first noise point and the first noise point is a brightness jump point that does not meet the first pre-determined condition with any one of other brightness jump points, and a connection line of edge points in the same group forms one edge line;

recognizing edge lines of lane boundaries from the edge lines; and grouping the edge lines of lane boundaries, and recognizing the edge lines in each group as edge lines of one lane boundary, wherein a difference between horizontal coordinates of any two of the edge lines of lane boundaries that is less than a second distance threshold is put into the same group.

18. The device according to claim 17, wherein the first pre-determined condition further comprises that a gradient angle between the any two of the edge points is less than a threshold of gradient angle;

and/or the noise points further comprise a second noise point, and the second noise point meets at least one of the following pre-determined conditions:

a second pre-determined condition being that: a difference between a mean gray level of a first left horizontal region and a mean gray level of a second left horizontal region is less than a first threshold of mean gray level;

a third pre-determined condition being that: a difference between a mean gray level of a first right horizontal region and a mean gray level of a second right horizontal region is less than a second threshold of mean gray level;

a fourth pre-determined condition being that: a difference between a gray level variance of a first left horizontal region and a gray level variance of a second left horizontal region is less than a first threshold of gray level variance;

a fifth pre-determined condition being that: a difference between a gray level variance of a first right horizontal region and a gray level variance of a second right horizontal region is less than a second threshold of gray level variance;

wherein, the first left horizontal region is a region consisting of a first left point, a vertical coordinate of the first left point is the same as that of the second noise point, a distance between a horizontal coordinate of the first left point and that of the second noise point is not greater than a third distance threshold, and the horizontal coordinate of the first left point is less than that of the second noise point;

the first right horizontal region is a region consisting of a first right point, a vertical coordinate of the first right point is the same as that of the second noise point, a distance between a horizontal coordinate of the first right point and that of the second noise point is not greater than the third distance threshold, and the horizontal coordinate of the first right point is greater than that of the second noise point;

the second left horizontal region is a region consisting of a second left point, a vertical coordinate of the second left point is the same as that of a reference jump point, a distance between a horizontal coordinate of the second left point and that of the reference jump point is not greater than the third distance threshold, and the horizontal coordinate of the second left point is less than that of the reference jump point;

the second right horizontal region is a region consisting of a second right point, a vertical coordinate of the second right point is the same as that of the reference jump point, a distance between a horizontal coordinate of the second right point and that of the reference jump point is not greater than the third distance threshold, and the horizontal coordinate of the second right point is greater than that of the reference jump point; and the reference jump point belongs to the brightness jump points, a distance between the horizontal coordinate of the reference jump point and that of the second noise point is less than the first distance threshold, a distance between the vertical coordinate of the reference jump point and that of the second noise point is less than a fourth distance threshold, and the vertical coordinate of the reference jump point is less than that of the second noise point.

19. The device according to claim 17, wherein the processor is further configured to recognize edge lines meeting a sixth pre-determined condition and/or a seventh pre-determined condition from the edge lines as the edge lines of the lane boundaries;

the sixth pre-determined condition is that: a confidence level of an edge line is greater than a confidence level threshold, the confidence level of the edge line represents a probability of the edge line belonging to the edge lines of the lane boundaries, and the confidence level of the edge line is calculated based on a real length of the edge line, a gray level deviation of two horizontal sides of the edge line in the current image, and gradient angles of edge points of the edge line; and the seventh pre-determined condition is that: an angle in a three-dimensional coordinate system between a lane marking line recognized from the current image and an edge line is less than an angle threshold.

20. The device according to claim 17, wherein, the processor is configured to recognize a lane boundary meeting an eighth pre-determined condition, a lane boundary meeting a ninth pre-determined condition and/or a lane boundary meeting a tenth pre-determined condition as curbs;

wherein the eighth pre-determined condition is that: a lane boundary comprises three edge lines, a horizontal distance between every two adjacent edge lines is less than a fifth distance threshold, and a horizontal distance between a leftmost edge line and a rightmost edge line of the lane boundary is less than a sixth distance threshold;

the ninth pre-determined condition is that: a lane boundary comprises two edge lines, a distance between horizontal coordinates of the two edge lines of the lane boundary is less than a seventh distance threshold, a gray level variance of a left region of the lane boundary is less than a third threshold of gray level variance, and a gray level variance of a right region of the lane boundary is greater than a fourth threshold of gray level variance;

the tenth pre-determined condition is that: a lane boundary comprises two edge lines, a distance between horizontal coordinates of the two edge lines of the lane boundary is less than the seventh distance threshold, a gray level variance of a left region of the lane boundary is greater than the third threshold of gray level variance, and a gray level variance of a right region of the lane boundary is less than the fourth threshold of gray level variance;

the left region of the lane boundary is a region consisting of a third left point, a vertical coordinate of the third left point is in a range of vertical coordinates of a left edge line of the lane boundary, a distance between a horizontal coordinate of the third left point and that of the left edge line of the lane boundary is not greater than the third distance threshold, and the horizontal coordinate of the third left point is less than that of the left edge line of the lane boundary; and the right region of the lane boundary is a region consisting of a third right point, a vertical coordinate of the third right point is in a range of vertical coordinates of a right edge line of the lane boundary, a distance between a horizontal coordinate of the third right point and that of the right edge line of the lane boundary is not greater than the third distance threshold, and the horizontal coordinate of the third right point is greater than that of the right edge line of the lane boundary.

* * * * *